US008737908B1

(12) United States Patent
Smith (10) Patent No.: US 8,737,908 B1
(45) Date of Patent: May 27, 2014

(54) INTERACTIVE BOOK AND SPATIAL ACCOUNTABILITY METHOD

(75) Inventor: Glenn G. Smith, Tampa, FL (US)

(73) Assignee: University of South Florida, Tampa, FL (US)

(*) Notice: Subject to any disclaimer, the term of this patent is extended or adjusted under 35 U.S.C. 154(b) by 1028 days.

(21) Appl. No.: 12/059,210

(22) Filed: Mar. 31, 2008

Related U.S. Application Data (60) Provisional application No. 60/909,227, filed on Mar. 30, 2007.

(51) Int. Cl.
*G09B 5/00* (2006.01)

(52) U.S. Cl.
USPC ........................................................ 434/317

(58) Field of Classification Search
USPC ........................................................ 434/317
See application file for complete search history.

(56) References Cited

U.S. PATENT DOCUMENTS

| | | | | |
|---|---|---|---|---|
| 5,636,995 | A * | 6/1997 | Sharpe et al. | 434/317 |
| 5,839,902 | A * | 11/1998 | Wood | 434/130 |
| 6,416,326 | B1 * | 7/2002 | Oh | 434/178 |
| 6,668,156 | B2 * | 12/2003 | Lynch et al. | 434/317 |
| 6,750,978 | B1 * | 6/2004 | Marggraff et al. | 358/1.12 |
| 6,915,103 | B2 * | 7/2005 | Blume | 358/1.12 |
| 7,557,939 | B2 * | 7/2009 | Marggraff et al. | 358/1.12 |
| 7,853,193 | B2 * | 12/2010 | Marggraff | 434/317 |
| 2001/0056439 | A1 * | 12/2001 | Carro | 707/500.1 |
| 2003/0018663 | A1 * | 1/2003 | Cornette et al. | 707/500.1 |
| 2003/0162162 | A1 * | 8/2003 | Marggraff | 434/410 |
| 2005/0055628 | A1 * | 3/2005 | Chen et al. | 715/512 |
| 2005/0208458 | A1 * | 9/2005 | Smith et al. | 434/128 |
| 2005/0244804 | A1 * | 11/2005 | Knight | 434/365 |
| 2008/0032276 | A1 * | 2/2008 | Zheng | 434/317 |

OTHER PUBLICATIONS

Zwaan, R. A., Langston, M. C., & Graesser, A. C. (1995). The construction of situation models in narrative comprehension: An event-indexing model. Psychological Science, 6, 292-297.*
Learning Wave [online dated Aug. 2005], retrieved on Oct. 16, 2012], Retrieved from internet: URL </web.archive.org/web/20050825192328/http://www.learningwave.com/abmath/>).*
Absurd Math Objectives [online ], retrieved on Oct. 16, 2012], Retrieved from internet: URL <http://www.learningwave.com/abmath/absurd4/index.htm>.*

(Continued)

*Primary Examiner* — Robert J Utama
*Assistant Examiner* — Sadaruz Zaman
(74) *Attorney, Agent, or Firm* — Nilay J. Choksi; Robert J. Varkonyi; Smith & Hopen, P.A.

(57) ABSTRACT

The current invention promotes accountability in reading, in terms of spatial, causal, temporal, protagonist, and intentionality elements of a story. A book with interactive maps was developed to emphasize the spatial and other dimensions of stories and encourage more spatial mental models, and generally more accurate situation models of the story. The interactive maps were printed on microdot paper and interspersed throughout the book, sometimes with successful completion of the activities required to obtain the page number of the next section of the book, which had been reordered in a non-sequential manner. Wireless electronic pens with cameras track X-Y location information from the microdot paper. Auditory feedback may be provided through a secondary device, like a personal computer, or directly using the electronic pen. The interactive book was tested on a group of sixth-grade students and found to reinforce spatial accountability.

14 Claims, 5 Drawing Sheets

(56) References Cited

OTHER PUBLICATIONS

Zwaan et al., "Construciton of situational models in narrative comprehension", Sep. 1995, Research Article, Psychological Science, vol. 6, No. 5, pp. 292-295.*

Choose_Your_Own_Adventure, retrieved on Jun. 6, 2013], Retrieved from internet: URL </http://en.wikipedia.org/wiki/Choose_Your_Own_Adventure.*

Peverly et al. 2001. "The Effects of Adjunct Questions and Feedback on Improving the Reading Comprehension of Learning-Disabled Adolescents." Contemporary Educational Psychology. vol. 26. pp. 25-43.

Rickards. 1979. "Adjunct Postquestions in Text: A Critical Review of Methods and Processes." vol. 49. No. 2. pp. 181-196.

Rickards. 1976. "Interaction of Position and Conceptual Level of Adjunct Questions on Immediate and Delayed Retention of Text." Journal of Educational Psychology. vol. 68. No. 2. pp. 210-217.

thefreedictionary.com, "Interactive—Definition of Interactive by the Free Online Dictionary, Thesaurus and Encyclopedia", http://www.thefreedictionary.com/interactive, Accessed on Mar. 19, 2012.

* cited by examiner

| | N | Mean | Std. Deviation |
|---|---|---|---|
| Fraction correct post-reading examinations | 46 | 0.616 | 0.172 |
| Time spatial discontinuity sentences, milliseconds | 46 | 3729 | 875 |
| Narratives Engrossing Likert | 46 | 3.27 | 0.8 |
| Time Individual post-reading examination item, milliseconds | 46 | 8206 | 1558 |

Figure 6.

| | Mean | Std. Deviation | N |
|---|---|---|---|
| Control | 3506 | 1179 | 46 |
| Non-contingent Accountable | 3833 | 1203 | 46 |
| Contingent Accountable | 3848 | 1092 | 46 |

Figure 7.

| | Mean | Std. Deviation | N |
|---|---|---|---|
| Control | 3506 | 1179 | 46 |
| Accountable (Contingent & Non-contingent) | 3841 | 1011 | 46 |

Figure 8.

| | Mean | Std. Deviation | N |
|---|---|---|---|
| Control | .561 | .223 | 46 |
| Non-contingent Accountable | .639 | .213 | 46 |
| Contingent Accountable | .648 | .214 | 46 |

Figure 9.

| | Mean | Std. Deviation | N |
|---|---|---|---|
| Control | .561 | .223 | 46 |
| Accountable (Contingent & Non-contingent) | .643 | .183 | 46 |

Figure 10.

INTERACTIVE BOOK AND SPATIAL ACCOUNTABILITY METHOD

CROSS REFERENCE TO RELATED APPLICATIONS

This application claims priority to currently U.S. Provisional Patent Application 60/909,227, entitled, "Interactive Map Book", filed Mar. 30, 2007, the contents of which are herein incorporated by reference.

FIELD OF INVENTION

This invention relates to interactive reading. More specifically, this invention relates the use of interactive activities within text-based books to increase spatial awareness accountability, as well as awareness of other dimensions of the narrative.

BACKGROUND OF THE INVENTION

Reading is increasingly losing ground to more visual media such as TV, and computer games (To read or not to read, 2007, NEA; Nov. 26, 2007, Newsweek, the future of reading). Approximately half of Americans between 18 and 24 years of age do not read any books for pleasure, and fewer than one-third of 13-year-olds read daily (Id. at page 7). Teenagers and adults 15-34 years old average only 7-9 minutes leisure reading daily, while averaging more than two hours on a typical weekday watching TV (Id.). Also, Americans average 58 minutes (male) and 44 minutes (female) each weekday playing videogames (Archives of Pediatrics & Adolescent Medicine, July 2007).

Readers create and update situation models from the stories they read. These situation models, created as people read text narratives, typically include information about time frame, causality, protagonists performing actions, and protagonist motivations/goals and spatial details of setting (Rinck, 2005; Zwaan, 1995). However, spatial information, about where things happen, is often ignored in these situation models under naturalistic reading conditions (Rinck, 2005; Zwaan, & van Oostendorp, 1994).

As people read text narratives, they focus on the surface features of the text, the particulars of the words, phrases and sentences. Readers also focus on the deeper content in the text, the situation described, to create a situation model of the story (Graesser, Millis, & Zwaan, 1997; Rinck, 2005). As people read sentence by sentence in a story, they update their situation model to reflect changes in these dimensions: 1) temporal (time frame of events), 2) causal (how one thing causes other things to happen), 3) protagonist dimension (who is currently performing the actions in the story), 4) intentionality dimension (the goal(s) of the characters) and 5) spatial (where things happen) (Zwaan, Langston and Graesser, 1995). Since, causal and temporal dimensions are fundamental to storytelling and grammatically embedded in language, then tend to be well represented in readers' situation models. However, for a variety of reasons, the spatial dimension is the poorest handled dimension (Zwaan and van Oostendorp, 1994).

Under naturalistic conditions, readers tend to opt out of maintaining a spatial situation model of even moderately complex spaces (Shah & Miyake, 2005). Spatial details of the setting of a text-based story are generally not central to the structure of the story. In (Zwaan, Radvansky, Hilliard, & Curiel (1998)), temporal, causal, protagonist and goal discontinuities all resulted in increased reading times, while spatial discontinuities did not. Part of the explanation may be the linearization problem, e.g., that text narratives are inherently linear and space is inherently non-linear (Zwaan and Radvansky, 1998), making it difficult to represent space from reading a text. Moreover, mental imagery is sometimes required to model a spatial setting from a story. The mental imagery needed to model a space is not automatic, but requires an effort of will (Hasher and Zacks, 1979).

There are exceptions in certain genres, where readers under naturalistic conditions make the effort to model the spatial situation. At the beginning of a detective story, a detailed description of the spatial arrangement of objects in a room warrants great attention, as seemingly innocuous objects and their locations may later provide clues to solving the crime. Also, in military history, the setting, configurations of battle terrain and locations of actions are fundamental to causation, such as an encircling maneuver or attacks from higher towards lower ground.

Students who are spatially strong, yet verbally weak, are often "turned off" by books and K-12 education, which tends to emphasize verbal, symbolic outcomes, while shortchanging visuospatial outcomes (Silverman, 1989; Smith, 1964). Yet, at a societal level, there is an unmet demand for visuospatial skills, which are vital for sciences, engineering, and other fields (Humphreys, Lubinski, & Yao, 1993).

Books stimulate the imagination more than visual electronic media because readers must construct more of the details of the story in their mind (Greenfield, 1993). Playing computer games may improve spatial skills (Okagaki & Frensch, 1994; Greenfield, 1994), while reading, watching TV and movies generally do not (Greenfield, 1993). One fundamental difference is that computer games make players accountable for the spatial setting, while books, movies and TV do not. Players of many computer games are accountable for where things happen and the layout of the virtual space (Greenfield, 1993). However, in naturalistic reading of text narratives, the spatial dimension is largely ignored.

Figure 1:
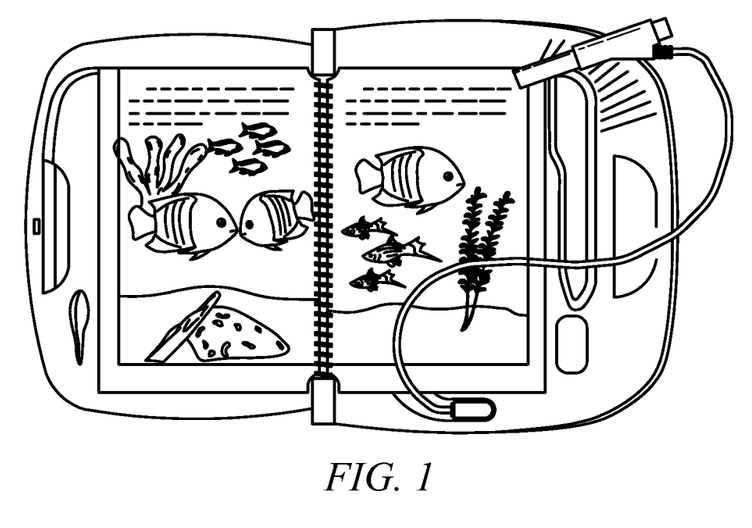
FIG. 1 is an image of a commercial LeapPad electronic book (LeapFrog).

Current products designed to stimulate learning and book reading involve interactive systems that provide sensory stimuli, like sounds, based on a reader's input. For example, the LeapPad, depicted in FIG. 1, is a commercial "interactive storybook [for children that lets the reader] touch the books' pages with a 'Magic Pencil' device to hear letter sounds and words read aloud, make characters 'come alive' and play learning activities," (LeapFrog, 2007). The pages of the LeapPad books rest on a portable electronic console with an attached stylus ("magic pencil") that provides context sensitive audio feedback when the user clicks on places on the page. Another variation of electronic reading is the integration of hardcopy books with related Web-based computer games. Scholastic plans the sale of a series of books ("The 39 clues") with associated Web-based games ("Scholastic plans to put its branding iron on a successor to Harry Potter", New York times, Dec. 18, 2007, section B1).

Additionally, various forms of purely computer-based reading combine elements of story and game. For example, interactive fiction provides a fictitious world in which the reader will often assume the role of the protagonist in a branching narrative. The reader/player makes choices that determine which of a number of pre-determined branches the story takes. Typically, interactive fiction is implemented with a computer program with text as input and output, but more recent versions of interaction fiction also use pictures and interaction with a mouse. Typically, there is a "structure of rules within which an outcome is sought", and "which produces narrative during interaction" (Monfort, 2007). Purely text-based computer games have largely fallen by the way-side, with the tremendous popularity of modern video/computer games with sophisticated computer graphics. However, interactive fiction such as Haunstetter (2008), which often combines text with graphics, may bring the genre back through the educational market.

The current invention imparts accountability to boost the spatial dimension of a situation model created while reading a text narrative, by transferring some of the spatial accountability common in video/computer games to the reading of linear text narratives (e.g., text-based stories).

SUMMARY OF THE INVENTION

"Contingent accountability" means a performance expectation, connected with contingent external rewards or punishments (e.g., a student is reading the first chapter of a novel, and will be later quizzed and graded on knowledge of the first chapter). Contingent accountability implies performance expectation with some subsequent situation but with no external rewards or punishments relates to the current task (e.g., a person is reading a newspaper story on the early years of rock and roll; later a quiz show on rock and roll will be on TV).

"Online" in the context of reading comprehension and situation models means "while reading," not "connected to the Internet."

"Online probes" means interrupting the reader during reading to ask about the situation model from the story. Readers construct spatial situation models and update the models based on current protagonist location.

Many studies have used directions to encourage readers to create spatial situation models. However, there is a subtle, yet real, distinction between being told to use a spatial situation model, versus being accountable for a situation model. The use of spatial probe questions embedded in a text narrative can represent a form of accountability.

Figure 2:
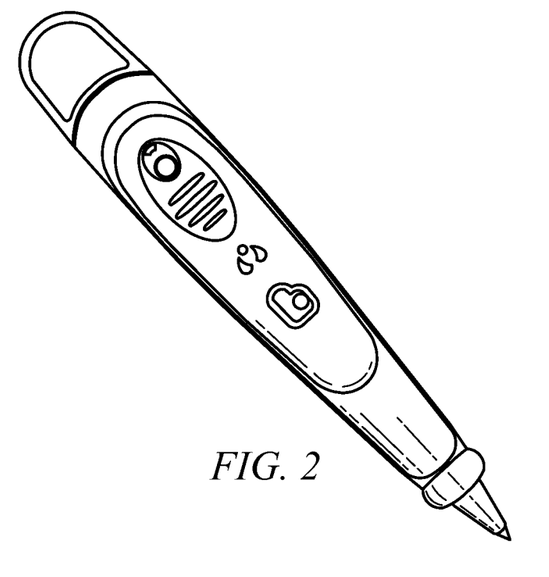
FIG. 2 is an image of a commercial Fly Pen electronic pen (LeapFrog).

Interactive forms of reading have the potential to combine computer game style spatial accountability with reading. Forms of online accountability, and specifically online probes, are potential design factors for interactive and electronic reading, design factors that may affect people's spatial situation models as they read. Thus, accountability has implications for new technological versions of reading, such as LeapPad (www.leapfrog.com), text-based computer games, and hypertext, etc. In interactive reading, readers can be made accountable for the spatial dimension of their situation models. For example, online accountability for the spatial dimension could be implemented in LeapPad books by having the audio feedback in the book ask the user to answer a spatial question about the story that requires the user to point with the magic pencil to a specific location on a picture or map. Additionally, LeapFrog has developed the FlyPen, shown in FIG. 2, which contains a processor and optical scanner. The FlyPen, used on special paper, allows the user to upload class notes or other files, manage schedules, and play downloaded games.

The current invention is based on the premise that online probes can make readers feel accountable for the spatial dimension and other dimensions of the situation model while they are reading, thus promoting online accountability, e.g., use of probes to make the reader feel accountable for the spatial dimension or some other dimension of the situation model created from the narrative in the online reading situation. A prototype hybrid hardcopy book with interactive maps was developed to emphasize the spatial or "where" dimension of stories, and encourage more spatial mental models of the story. The prototype also promotes awareness of other dimensions of the story, including the causal, temporal, protagonist and intentionality situation aspects of the narrative.

The prototype hybrid book, an ordinary book combined with interactive maps printed on microdot paper was developed, with the interactive maps interspersed throughout the book. Wireless electronic pens ("C-pens") with miniature cameras were obtained. In some embodiments, the electronic pen is a C-pen from Anoto (Anoto Corp., Sweden). In another embodiment, the electronic pen is a FlyPen (LeapFrog Corp., USA). The C-pen interacts with microdot paper detecting X-Y location information from the microdot paper, X-Y information from pen taps, strokes, freehand lines, along with time stamps and pressure information.

The C-pen interacts with a computer in one embodiment via a Bluetooth transmitter. The signals, received by a Bluetooth compatible receiver are accepted by a computer program. The signal data is interpreted and translated into a predetermined output signal, which may be auditory or visual. Alternatively, the C-pen may be completely self-sufficient and contain a microprocessor, with program cartridges, and attached speaker/earphones.

The interactive book was tested using a group of sixth-grade students, asked to read the prototype book and interact with maps, via a electronic "camera" C-pens. The C-pen comprised a camera, integrated instructions and an integrated speaker. Alternatively, the book and interactive maps are used in conjunction with wireless electronic "camera" C-pens. The wireless C-pen collected data from each map and transmitted the data to a computer, where it was processed by a C++ program and an auditory feedback sent back to the reader wearing wireless earphones.

It is also envisioned that the interactive book may provide direction to the user, for example, information on what page to turn to in the book to read the next section of the story, either through audio or visual feedback instructions loaded in the C-pen or an external computer. The invention may provide feedback through any known audio or visual methods, examples include wireless earphones worn by the reader, wired earphones worn by the reader, external speakers, or speakers integrated into the C-pen, an LCD screen, lights, a plasma screen, and a CRT screen.

Further, the interactive book may be designed for two dimensional or three dimensional use, including maps, illustrations from the text, pop-up models, and pop-up maps. Other methods of creating a two dimensional or three dimensional text-based rendering are known in the art and within the ordinary skill within the field.

While the students' opinions of the text ranged from interesting to dull and boring, the students found the maps engaging and reported the maps forced the student to reread the text to solve each map. Further, the students reported that more understanding the text was necessary to solve the map at the end, thus turning the reading into "a game."

Spatial accountability was then tested on undergraduate college students using three naturalistic short stories, requiring approximately five minutes each to read. Each story relied on the configuration of the space for causation in each story. The students red the text on a web browser, then clicked with their mouse on a "next" button on the screen to move on to the next sentence. Spatial probes (multiple-choice questions), filler questions and post-reading examinations were also displayed on the browser window, with participants clicking on buttons onscreen to answer questions. For all sentences read and questions answered, elapsed times, and where appropriate, answers, were written to an online database.

The college students read a story in each of the three conditions: control, contingent accountable and non-contingent accountable. In the control (non-accountable reading) condition, the college students read sentence by sentence, hitting the next button to move on, with no embedded spatial probes. In the Contingent Accountable condition, college students were advised before reading the narrative that they would have to periodically verify spatial components in order to proceed with reading the text. Probes asked spatial questions relating to the story, with answers were cast in cardinal and relative directions. Participants were not allowed to proceed with the narrative until they had answered the spatial probe correctly.

After reading all three narratives, participants performed a five minute filler task, and then took three post-reading examinations, each associated with a narrative. Greater time spent reading sentences with spatial discontinuities was indicative of monitoring and updating the spatial situation model, and as were higher correct answers on post-reading examination.

BRIEF DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

Figure 3:
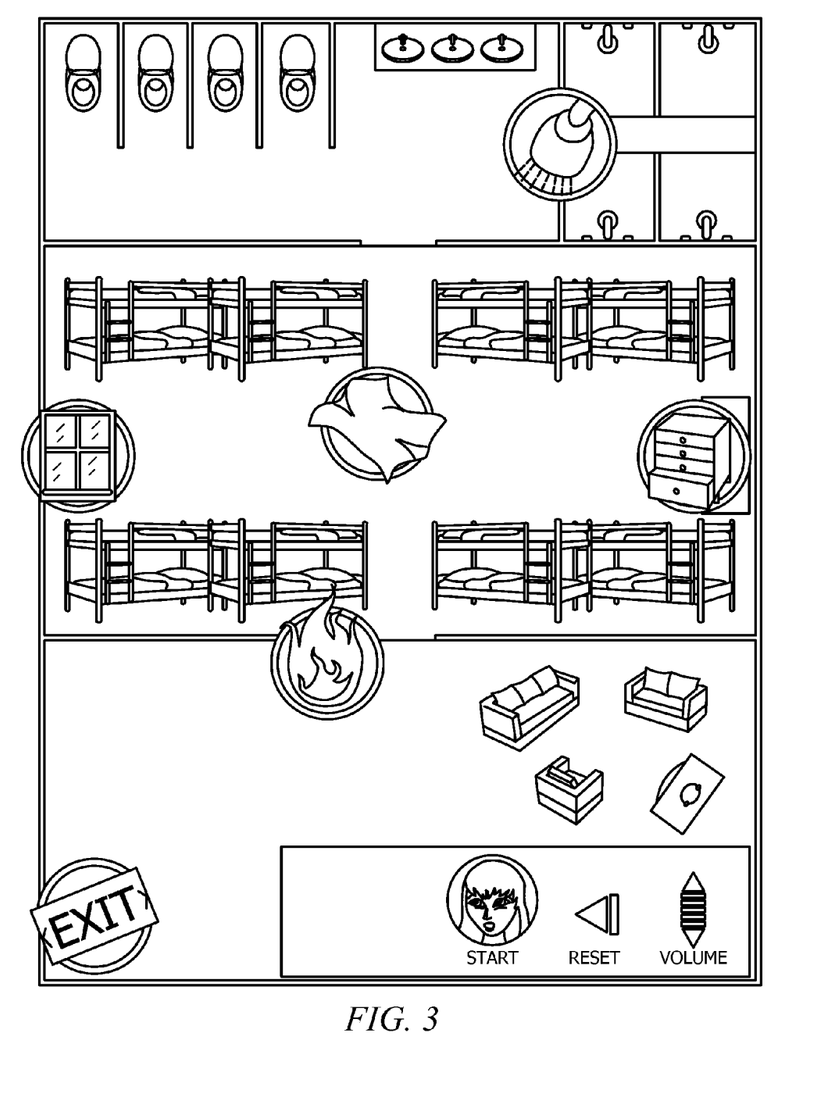
FIG. 3 is an illustration of an exemplary interactive activity used to test spatial understanding of the readers.
Figure 4:
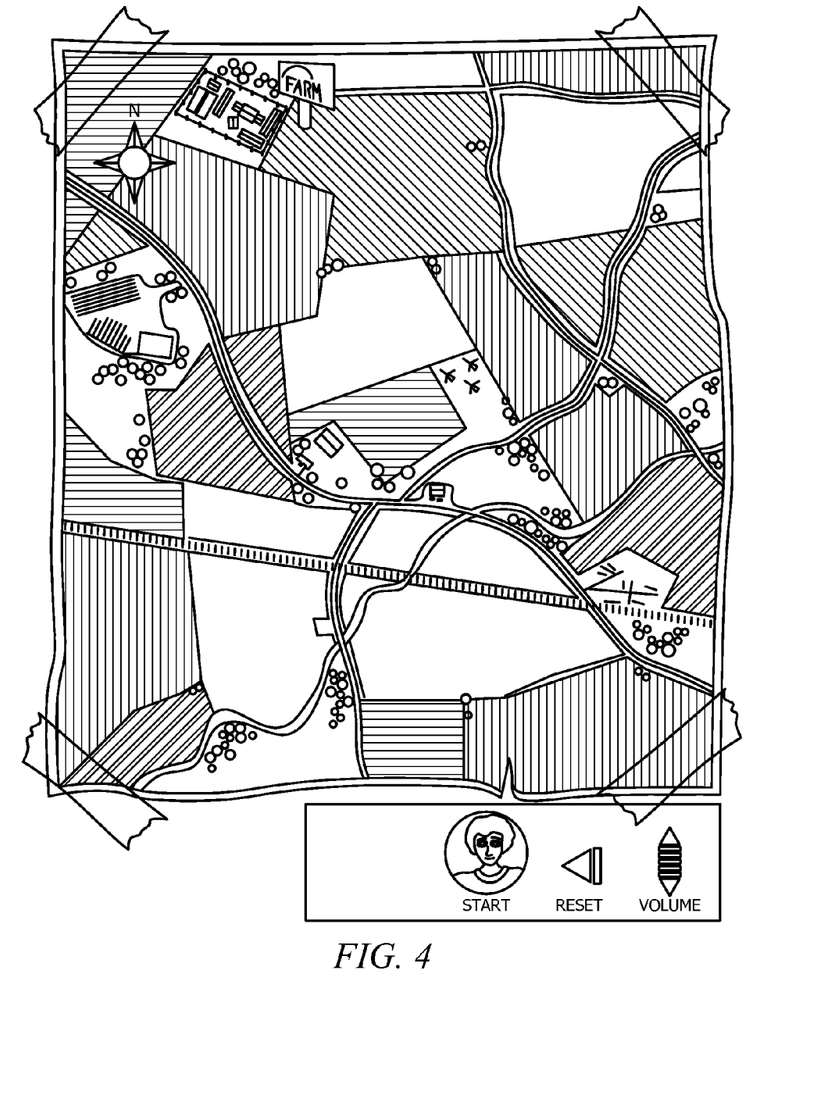
FIG. 4 is an illustration of an exemplary interactive map used to test spatial understanding of the readers.

A prototype hybrid hardcopy book with interactive maps was developed to emphasize the spatial or "where" dimension of stories, and encourage more spatial mental models of the story, as well as to emphasize other dimensions of the situation model such as causal, temporal, protagonist and intentionality. The hybrid book-map was built by interspersing interactive maps printed on microdot paper between some pages of an ordinary book. See FIGS. 3 and 4. The book is paired with an electronic camera pen, such as the FlyPen (LeapFrog Corp., USA), or similar microprocessor-based pen based on the C-pen. The FlyPen is a pen device containing at small computer that interacts with microdot paper. The FlyPen, which also writes with ink, contains a small optical "camera" which detects X-Y location information from the microdot paper, X-Y information from pen taps, strokes, freehand lines, along with time stamps and pressure information. Page information may also be stored on the microdot paper. This information is processed by a computer within the FlyPen, with feedback being sent back to the user via audio (speaker or earphone). Feedback can also be downloaded to a computer via docking station, or in some versions of C-pens by Bluetooth.

Figure 6:
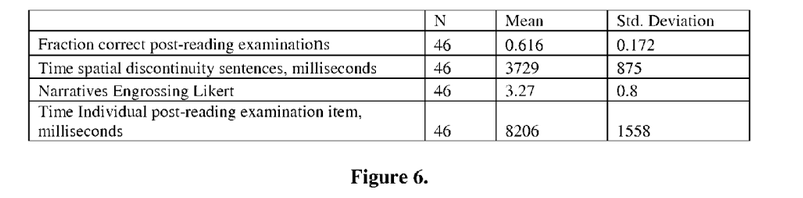
FIG. 6 is a table showing the descriptive statistics all conditions; non-contingent accountable, contingent accountable, and non-accountable reading.

Information from the FlyPen is inputted into a C++ program and X and Y coordinates are identified from the microdot paper. The coordinates are compared with a series of "feedback" coordinates. The "feedback" coordinates are generally predetermined coordinates associated with a specific area of the interactive map, and linked to correctly completing the interactive map. An audio file is accessed if the "feedback" coordinates and FlyPen coordinates match, providing the reader with positive or negative feedback. The interactive map keeps track of what the user has done so far on the map, and gives positive or negative feedback, in the style of the story, based on this context. There are a series of interactions the user must perform correctly to complete the map activity. In computer science terminology, the interactive map is a "state machine" in which for each successive state (state 1, state 2, state 3), there is a correct response (or set of responses) that the user can perform by tapping or drawing on the map in specific regions. There are also incorrect "distracter" regions, from which the user will get also audio feedback, but in this case indicating, in terms reminiscent of the story, that this is not a correct response. On a correct response, the user gets audio feedback indicating so (usually in terms of language or sounds reminiscent of the story), and then the "state machine" is incremented to the next state. The user must perform the correct response at each state, up to the final state. Upon completion of the final state the user is informed of the next page to turn to, since the sections of the book (each ending in an interactive map activity) have been reordered. Thus, it is necessary to complete the map activities for the reader to find their way through the book. The interactive map book is composed of sections of the book, each ending in an interactive map. The sections of the book have been re-arranged so that it is necessary to solve the interactive map activities to get, via audio, the page number of the next section of the book to read. The first working example of the interactive map book was adapted from a commercially published novel, Chasing the Falconers. FIG. 6 shows a reader interacting with the interactive map book.

The program was developed using FLY SDK v1.0.2, which processes input from the FlyPen as it interacts with the microdot printout, i.e. the X and Y coordinate information encoded in the microdot paper. The program compares the input coordinates with a set of determined "feedback" coordinates, based on the how the user has interacted so far with the map (e.g. the current status of the state machine), and outputs sound, as appropriate. Programming of the FLY SDK v1.0.2 requires the use of ARC Metaware Development Toolkit (SDK), a C++ compiler for embedded applications (e.g., programs embedded in small devices such as the FlyPen).

Example 1

A test group of fifth and sixth-grade students were provided copies of the hybrid hardcopy book and electronic "camera"

Figure 5:
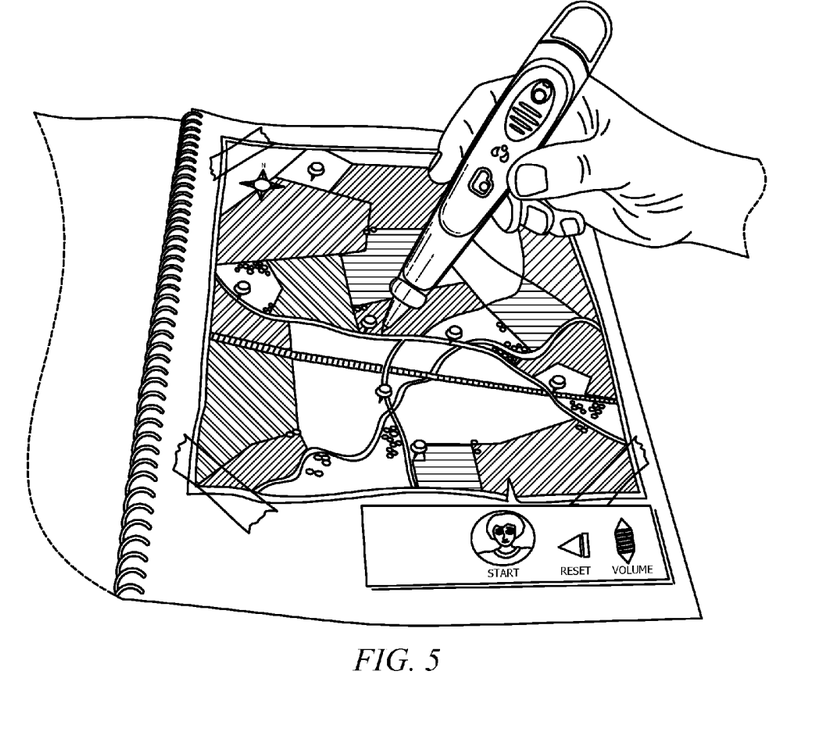
FIG. 5 is an illustration of an exemplary interactive map used to test spatial understanding of the readers in use with the present interactive book system.

FlyPens. The group consisted of one fifth grade girl, two sixth grade girls and one sixth-grade boy. The girls were avid readers and had a moderate to low interest in video games, while the boy was a light reader with more of an interest in computer games. The students were asked to read the prototype book as well as interact with interspersed maps, via wireless electronic "camera" FlyPens, to encourage them to create and maintain a more spatial situation model of the story, as well as to pay more attention to other dimensions of the situation model of the story, such as causal, temporal, protagonist and intentionality. The FlyPen collected data from each map and processed it in real-time using an embedded C++ program, providing auditory feedback sent to the reader, seen in FIG. 5.

Students were first given a brief orientation to the book and the FlyPen utilizing the introductory test page in the book. Once they felt comfortable they were asked to read the story following the instructions in the book. Within a few pages of reading the beginning book the students came to an interactive map. See FIGS. 3, 4, and 5. As per FIGS. 3, 4, and 5, completing the task on these interactive maps required accurate maintenance of various dimensions of situation model, including causal, temporal, protagonist, intentionality and the spatial situation, from the previous text pages. It is that completion of the interactive map promotes creation and updating of the spatial situation model while reading subsequent pages, until the next interactive map.

The students were very excited to try out the pen and appreciated the responsiveness of the interactive pen to their actions. Quickly, the students related the pen's interactive responses to an additional character. Further, the students enjoyed the involving nature of the maps, stating, "I like the interaction with the pen and how you have to think about where you're going." Another student, who found the story dull, superficially read the book and thus had trouble figuring out the maps or relating them to the text. After going back to the text she understood the maps much more. The male student appeared interested only in the technology and the operation of the maps, and failed to read the story. He admitted to attempting to complete the maps without reading the text, but found this too difficult. He then turned to the text to try and solve the map, but claimed to enjoy the book more now that he understood he would have to solve the map at the end, turning the reading into "a game."

The fifth grade student found the book moderately enjoyable, but that the story was terrible and took too long to read. As such, the student found it difficult to focus on the reading and didn't pay close attention until she reached the maps and realized a strong grasp of the test was required to understand the maps. The overall enjoyment of the maps heightened her interest in the story and she suggested more interactions integrated throughout the book would improve involvement in the story.

Upon completing the story, the students were asked to complete a survey. The pen and map interaction at the end of the story not only provided entertainment and engaged the students, it required the student to carefully read the story, which indicates use of technology in this way serves to support reading, not supplant it. Students did comments on desiring more interaction, with an overall positive response.

Example 2

Forty-six undergraduate college students with an average age of 20.4 years (9 male, 37 female), participated in the test study. Participants took part in the one session experiment for five points of extra credit in their course.

Three naturalistic short stories, requiring approximately five minutes each to read, were drafted, taking place in a zoo, a boat, and a small private museum. See below for one of the narratives. The configuration of the space was important to the causation in each story. The narratives were equivalent in length, complexity of the spaces, the number of protagonist changes of location (sentences with spatial discontinuities), the number of characters, and the number of objects in the stories. Each story had six spatial discontinuity sentences (sentences with change in location). Since the number of syllables is the most significant factor in reading time of sentences, each spatial discontinuity sentence had 17 syllables, a convenient number for writing the sentences.

Each narrative had a similar structure. After the conflict introduction sentence(s), each narrative included a description of a five room space, described both in terms of: a) names of the rooms (e.g. "sculpture room"), b) cardinal directions (North, South, East and West) and c) relative directions (upper, lower, right and left) as if looking at a map. Both cardinal and relative directions were used because some people are more comfortable with one orientation system or another. Once the action of the story got under way, protagonist movements were described, not in terms of cardinal or relative directions, but in terms of the name of rooms (e.g., "In the painting room"), so that embedded spatial queries would tap into the readers' spatial situation model, not the most recent surface details of the text. Readers encountered six spatial probes embedded in each narrative, as seen below.

The Zookeeper and the Leopard

Rolf, the old zoo keeper, had cleaned the leopard cage thousands of times without a hitch. As the daily provider of their food, the leopards knew Rolf well and perhaps even loved him in their own way. However, Rolf also knew that, deep in their nature, the leopards had a killer's instinct and would have preferred to eat live prey. The procedure for feeding the leopards was very simple. The leopard cage had an outdoor area to the North and a private, indoor room to the South, reachable through a "leopard door." Rolf lowered the meat by rope into the indoor room. The hungry leopards adjourned to the indoor room for their feast. Using a rope and pulley, Rolf lowered the door to the indoor area. After checking that there were no leopards in the outdoor cage, he would then unlock the leopard cage and go in to clean the cage. On this fateful afternoon, he checked the outdoor leopard cage, saw no leopards. So he unlocked the cage, and was about to step in, when just out of the corner of his eye, he saw something dark high up above his head. The female leopard was perched high up on a tiny ledge, making her body as small as possible, trying not to be seen. Rolf jumped back out through the cage door and tried to lock the door, but the leopard pounced against the cage door. The impact sent Rolf sprawling and bent the key in the lock, so the cage door could not be locked, nor the keys removed.

Here was the situation. The zoo was closed for maintenance. The leopard cage was in a locked, gated enclosure with four rooms. On the South side were the leopard and lion cages. To the North were the snack bar and the information room. A hallway, with a bench, ran East and West between the big cat cages on the South side, and the snack bar and information rooms on the North. The leopard cage was in the South-East corner, which would be lower-right on a map.

<Spatial probe: Where is the leopard room? A) North-West (upper-left), B) North-East (upper-right), C) Center, D) South-West (lower-left), E) South-East (lower-right), Correct=E, 2>

The lion cage was to the South-West, or lower left, with the lions already locked safely in their inner cage. The snack bar with its concession stand was to the North-East (upper right on a map). The information room was to the North-West (upper-left).

<Spatial probe: Where is the information room? A) North-West (upper-left), B) North-East (upper-right), C) Center, D) South-West (lower-left), E) South-East (lower-right), Correct=A, 2>

Rolf thought of the layout whimsically like this: Africa is South, so the big cats were to the South. Industrialized Europe is to the North and West, so the information center is North-West. Leopards, like Middle-Easterners, are more mysterious, so the Leopard room is to the South-East.

The impact of the leopard pouncing against the cage door had sent Rolf sprawling and banging his head. He ducked behind the concession stand in the snack bar to calm himself What things could he use to protect himself with?

<Spatial probe: Which room is Rolf currently in? A) North-West (upper-left), B) North-East (upper-right), C) Center, D) South-West (lower-left), E) South-East (lower-right), Correct=B, 2>

He knew there was a crowbar in the lion room, carelessly left behind by a maintenance worker. In the leopard room was a scrub bucket. Could the typewriter in the information center be hurled? He recalled a knife on the counter in the snack bar. He saw the knife and realized it was too small to intimidate a leopard.

Should he call another zookeeper, using his cell phone, which he had left in his backpack in the outer lion room? Or should he get the tranquilizer gun? It depended on where the leopard was. Out in the hallway, he looked both ways, but he did not see the leopard. He wondered if the drinking fountain in the hallway might attract the leopard.

<Spatial probe: Is the bench currently in the same room as Rolf?, Correct=True, type=1>

He almost stumbled over a folding chair. He was quite relieved to see no leopard in the information room. He dashed behind the information counter and pulled down the tranquilizer gun. There was no cartridge in it. He fumbled on the information counter, found a cartridge and popped it into the gun. Now that he had the tranquilizer gun, he knew if he was facing the leopard he could shoot and may be live.

If he showed his back, the leopard would pounce and he would die. The safest thing would be to stand in the door of the information room, wait until the leopard appeared and then shoot her; either that or another zookeeper might come, look for him and unlock the gated enclosure. He stood silently, waiting for the leopard, hearing tiny noises come from other rooms. Was that the sound of the ice maker in the refrigerator, or was the leopard pawing around in the snack bar? A lion growled. Had the leopard snuck into the lion room? Or was the leopard still in the leopard room? It was getting dark. He did not want to spend the night with a leopard. Which room was the leopard in? He could not afford to turn his back on the leopard. In the lion room, he looked around quite carefully and saw nothing. He saw nothing dangerous, only his backpack, but no leopard. Instinctively, he picked up his backpack.

<Spatial probe: Which room is Rolf currently in? A) North-West (upper-left), B) North-East (upper-right), C) Center, D) South-West (lower-left), E) South-East (lower-right), Correct=D, 2>

He could not hold his backpack and shoot effectively. Out in the hallway, Rolf quietly set his backpack down on the bench. He took a few careful steps in the hallway, listening intently. Which room was left for the leopard to hide? In the leopard room, he stealthily looked around, but saw no leopard.

There was a piece of frayed rope the leopards sometimes played with. Out of the corner of his eye, he saw movement and spun towards the door. The leopard was charging in the through the door.

<Spatial probe: Which room is Rolf currently in? A) North-West (upper-left), B) North-East (upper-right), C) Center, D) South-West (lower-left), E) South-East (lower-right), Correct=E, 2>

He raised the tranquilizer gun and fired. The leopard flew through the air, landing on him Blackness descended.

He awoke blinking his eyes to a bright, white light. Was he in heaven, or hell? No, there was a nurse helping him to sit up from the floor of the leopard room. It was daylight.

Participants came to a computer laboratory for a one session experiment, lasting approximately 45 minutes. Participants read narratives one sentence at a time displayed on a web browser, then clicked with their mouse on a "next" button on the screen to move on to the next sentence. Spatial probes (multiple-choice questions), filler questions and post-reading examinations were also displayed on the browser window, with participants clicking on buttons onscreen to answer questions. For all sentences read and questions answered, elapsed times, and where appropriate, answers, were written to an online database.

Each participant read a story in each of the three conditions: control, contingent accountable and non-contingent accountable. In the control (non-accountable reading) condition (C), participants read sentence by sentence, hitting the next button to move on, with no embedded spatial probes. In the Contingent Accountable condition (AC), participants were advised immediately before reading the narrative that they would have to periodically verify spatial components in order to proceed with reading the next sentence of the narrative. Here are the directions for the contingent accountable condition: "As you read the following story, you will periodically be asked to verify WHERE things happen (and WHERE rooms are) in the story before you can proceed with reading the next section. YOU WILL NEED TO ANSWER THE QUESTIONS CORRECTLY IN ORDER TO CONTINUE READING THE STORY. If you don't at first correctly answer the question, you may try again. But it is better if you get it correct with fewer tries. You should try to finish reading the story to get full credit in study. Please start reading the story." They were advised to try to complete the narrative, to get full extra credit for their class. In the contingent accountable condition, participants periodically encountered multiple-choice spatial probes embedded in the text. Such probes asked which room the protagonist currently was in. Answers were cast in cardinal and relative directions. Participants were not allowed to proceed with the narrative until they had answered the spatial probe correctly. If the participant guessed wrong twice, they notified that they might lose credit.

Conditions for the non-contingent accountable were identical to contingent, except that participants did not have to answer correctly before proceeding. Moreover, they were advised immediately before reading the narrative that they were no contingencies depending on their answers to spatial probes. Here are the directions for the non-contingent accountable condition: "As you read the following story, you will periodically be asked questions about WHERE things happen (and WHERE rooms are) in the story. However, you do NOT have to answer the questions correctly to proceed with the reading or to get extra credit. Extra credit is NOT contingent on your answers in this story. Please start reading the story." Once non-contingent accountable participants received feedback on the correct answer, they were allowed to proceed with reading the next sentence.

In both the contingent accountable and non-contingent accountable conditions, participants received feedback on correct answers.

After reading all three narratives, participants performed a five minute filler task, and then took three post-reading examinations, each associated with a narrative. Each post-reading examination included a map of the space with five rooms labeled "A) North Top, B) West Left," etc. See FIG. 5 for an example map. While the map was displayed, participants answered 10 multiple choice questions, such as "In the zoo keeper story, where did Rolf shoot the tranquilizer gun? A), B), C), D), or E)"

Greater time spent reading sentences with spatial discontinuities is indicative of monitoring and updating the spatial situation model. A major result of the study was that participants, during accountable conditions, spent significantly more time reading sentences with spatial discontinuities than they did under non-accountable reading conditions, as seen in FIG. 6 overall results.

Figure 7:
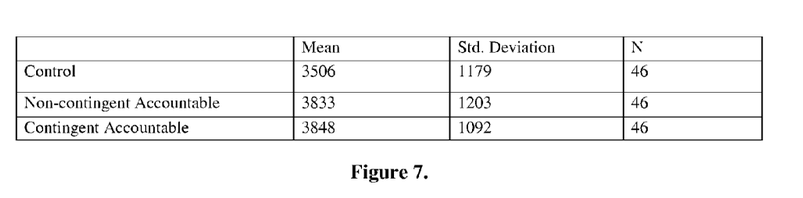
FIG. 7 is a table showing average elapsed times in milliseconds for spatial discontinuity sentences, by condition.
Figure 8:
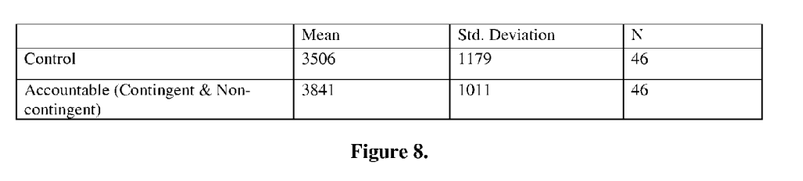
FIG. 8 is a table showing the average elapsed times in milliseconds for spatial discontinuity sentences, for accountable versus control conditions.

It is notable that the average fraction correct on post-reading examination is well above the fraction that would be expected from guessing a five answer multiple-choice question (2). Participants were somewhat neutral about how engrossing and interesting were the narratives, e.g., approximately 3 on a scale of 1 to 5. On average, they took approximately 4 seconds to read each spatial discontinuity sentence of 17 syllables. Further, the time required reading contingent and non-contingent accountable conditions did not vary between the two conditions, and each took longer than in the control condition, seen in FIGS. 7 and 8.

The research was designed to distinguish non-contingent from contingent accountability, e.g., answering online probes without consequences versus answering probes with later hypothetical consequences ("you may lose credit"). Participants in the non-contingent accountable condition did as well on spatial discontinuities post-reading examination as in the contingent accountable condition, suggesting the effect of extrinsic contingencies may be much smaller than online accountability itself. The immediate perception of readers while reading that they may, at any moment, need to use spatial information may be quite powerful in encouraging them to monitor spatial details, much more powerful than contingencies remote in time.

Online probes, asking about spatial aspects of the story, increase the updating of spatial information during reading. The implication for electronic reading is that embedded online probes encourage readers to monitor spatial information on the first reading of a text.

Figure 9:
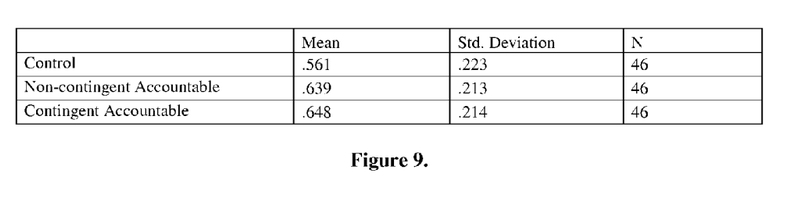
FIG. 9 is a table showing the average fraction correct on post-reading examination, by condition for the fraction correct (1) versus incorrect (0) on the post-reading examination. Best to worst on the post-reading examination was Contingent accountable, non-contingent accountable, followed by Control. A one-way within-subjects ANOVA (repeated measures) of average correctness on post-reading examination s was significant, $[F(2, 43)=4.02, p<0.02]$ T-test $t(45)=0.092$, $p<0.927$

Participants in accountable conditions got significantly more post-reading examination items correct than they did in non-accountable conditions, as seen in FIG. 9. The post-reading examination tested Long Term Memory (LTM) retention of the spatial setting of the story, and also LTM retention of locations of objects partway through the story. In order to correctly answer the post-reading examination items, the reader had to have originally, while reading, correctly construct and update the spatial situation model, and retain the model in LTM, during the course of the filler task, the spatial situation model, including intermediary and final states of the situation model. Accountability while reading (e.g. online probes) probably had two effects: a) it increased likelihood of creation and update of the spatial situation model, as opposed to opting out of the spatial dimension, and b) for those who chose to create/update the spatial situation model, the online probes increased elaboration and thus long term retention of the spatial situation model.

Figure 10:
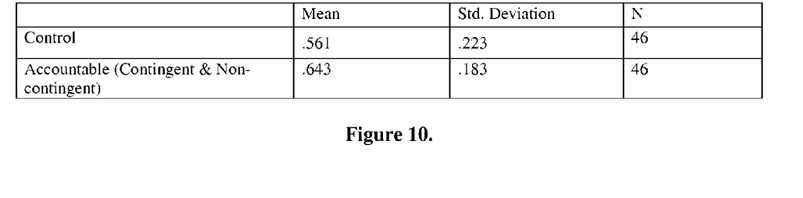
FIG. 10 is a table showing the average fraction correct on post-reading examination, for accountable versus control conditions sample t-test, $t(45)=2.71, p<0.01$ (one-tailed), $d=0.48$.

In comparing all three groups (control versus contingent accountable versus non-contingent), an ANOVA analysis of the differences were close to, but did not quite reach significance, $[F(1, 46)=3.21, p<0.08]$. A post hoc LSD analysis indicated that participants in both the Contingent and Non-contingent accountable conditions performed significantly better ($p<0.05$) on the post-reading examinations than did the control group. There was no significant difference between the Contingent and Non-contingent accountable conditions on the post-reading examinations. Further, the results indicate the accountable (contingent and non-contingent accountable) conditions resulted in higher mean fraction correct than for the non-accountable/control condition, as seen in FIG. 10.

A number of subsidiary variables relating to condition were also examined. For the contingent accountable condition, the average number of attempts on the spatial probe questions (while reading) needed to obtain a correct answer was 1.6 attempts, with a standard deviation of 0.6. For the non-contingent accountable group, the fraction correct on the spatial probes was 0.635, with a standard deviation of 0.3.

Considering that there is voluminous research results suggesting differences in spatial skills (such as mental rotation) between males and females, the investigators also examined the dependent variables and some subsidiary variables by gender. When comparing males (9) and females (37) across conditions, there were no significant differences in the following variables which were examined: fraction correct in post-reading examinations, time to read spatial discontinuity sentences, Likert-scale questions on how engrossing narratives were, and average times on the post-reading examinations. The one notable effect of gender found was that selecting only female participants increased the level of significance of the between condition differences on fraction correct on the post-reading examination. In other words, when looking at the whole pool of participants (male and female), for fraction post-reading examination correct, the significance between gender was 0.02, $[F(1, 45)=4.02, p<0.02]$. When including only female participants, the significance level was 0.01 $[F(1, 37)=4.88, p<0.01]$.

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween. Now that the invention has been described, What is claimed is:

1. An interactive book comprising:
   a linear text storyline arranged into chapters, wherein each chapter is arranged in a non-linear fashion relative to the other chapters, such that a reader gains access to a subsequent chapters with successful completion of a task in a previous chapter;

wherein access refers to a reader's ability to read the story in a linear fashion;

at least one microdot paper comprising interactive activities based on the themes and situation models of the text storyline adapted to promote the creation and updating of situation models selected from the group consisting of thematic, spatial, causal, temporal, protagonist and intentionality of characters disposed at the end of each chapter;

an electronic C-pen adapted to detect positional information from the microdot paper, wherein the C-pen detects the page numbers from the interactive activities using information encoded in the at least one microdot paper, wherein the interactive activities include maps, diagrams, or images interspersed within the book;

an electronic device having
- an input to accept the positional information from the electronic C-pen;
- a logic module adapted to determine if the interactive activities based on the themes and situation models of the text storyline disposed on the at least one microdot paper has been successfully completed; and
- an output to provide access to a reader upon winning the game or successful completion of the interactive activities based on the themes and situation models of the text storyline disposed on the at least one microdot paper has been successfully completed at the end of the chapter,
- wherein said output provides directions to the reader where the next page number of the next chapter such that the reader can access the next chapter and continue reading the text storyline.

2. The interactive book of claim 1, wherein the C-pen detects the positional information through X-Y location information from the microdot paper, X-Y information from pen actions selected from the group consisting of: pen taps, strokes, freehand lines, user input data, time stamps, and pressure information.

3. The interactive book of claim 1, wherein the activities are adapted for two dimensional or three dimensional use.

4. The interactive book of claim 2, wherein the C-pen detects the positional information and provides feedback through executable instructions.

5. The interactive book of claim 4, wherein the executable instructions accept positional information data and output a feedback signal, comprising:
- inputting positional information data from the C-pen;
- comparing the positional information from the C-pen with feedback positional data; and
- outputting a feedback signal to a device to provide user feedback.

6. One or more non-transitory tangible computer-usable media having computer-executable instructions for performing a method by running a software program on a computer, the computer operating under an operating system, the method including issuing instructions from the software program to increasereading accountability of spatial, temporal, causal, protagonist and intentionality dimensions of a narrative, the instructions comprising:
- providing a book with a linear text storyline arranged into chapters, wherein each chapter is arranged in a non-linear fashion with the other chapters, such that the story may not be read continuously, and wherein there is information disclosing where to locate the next chapter in the text with successful completion of a task in a previous chapter, or
- a linear text storyline arranged into chapters in a web-based or electronic format, wherein the reader has access to the current chapter and all the previous chapters read, but does not have access to upcoming chapters;
- providing interactive activities printed on microdot paper disposed at the end of each chapter wherein the interactive activities are based on the themes and situation models of the text storyline adapted to promote the creation and updating of situation models selected from the group consisting of thematic, spatial, causal, temporal, protagonist and intentionality of characters, wherein the interactive activities include maps, diagrams, or images based on the situations in the book text;
- providing interactive activities adapted to retroactively assess the narrative in previously read pages, proactively anticipate narrative events in upcoming text, or substitute for portions of the narrative which might otherwise be contained in the text;
- providing an electronic C-pen, wherein the C-pen is adapted to track pen movements on the microdot paper;
- obtaining positional information from the electronic C-pen to determine if the interactive activities based on the themes and situation models of the text storyline disposed on the at least one microdot paper has been successfully completed; and
- providing directions to a reader upon successful completion of the interactive activities based on the themes and situation models of the text storyline disposed on the at least one microdot paper or web-based or electronic game or activity has been successfully completed at the end of the chapter,
- wherein the directions provide the reader the next page number of the non-linear storyline.

7. The one or more non-transitory tangible computer-usable media of claim 6, wherein the interactive activities are adapted to test situation models of the narrative selected from the group consisting of dimensional, causal, temporal, protagonist, intentionality and spatial.

8. The one or more non-transitory tangible computer-usable media of claim 6, wherein the interactive activities are interspersed within the book.

9. An electronic interactive book comprising:
- a linear storyline arranged into independent chapters in a web-based or electronic format,
  - where the reader is given select access only to a chapter and all previous chapters, and
  - at least one web-based or electronic interactive activity based on the themes and situation models of the text storyline adapted to promote the creation and updating of situation models selected from the group consisting of thematic, spatial, causal, temporal, protagonist and intentionality of characters disposed at the end of each chapter,
  - wherein the at least one interactive activity includes a map, a diagram, or an image based on the themes and situation models, wherein the at least one interactive activity is interspersed within the book; and
- an electronic device having
  - an input to accept the positional information from the at least one interactive activity,
  - a logic module adapted to determine if the interactive activities based on the themes and situation models of the text storyline disposed at the end of each chapter been successfully completed, and an output to provide a reader with access to the next chapter of the storyline upon successful completion of the interactive activities based on the themes and situation models of the text storyline disposed on the at least one microdot paper has been successfully completed at the end of the chapter.

10. The electronic interactive book of claim 9, wherein the electronic device prevents a user from accessing at least a portion of the storyline until the interactive activities are successfully completed.

11. The electronic interactive book of claim 10, wherein the user has access to previous chapters of the storyline.

12. The interactive book of claim 1, wherein the interactive activities are games.

13. The method of claim 6, wherein the interactive activities are games.

14. The electronic interactive book of claim 9, wherein the at least one interactive activity is a game.

* * * * *